United States Patent
Akiki et al.

(10) Patent No.: US 12,326,292 B2
(45) Date of Patent: Jun. 10, 2025

(54) METHOD FOR DEFROSTING A THERMAL REGULATION CIRCUIT FOR A VEHICLE, IN PARTICULAR FOR A MOTOR VEHICLE

(71) Applicant: Valeo Systemes Thermiques, Le Mesnil-Saint-Denis (FR)

(72) Inventors: Roland Akiki, Le Mesnil-Saint-Denis (FR); Jin-Ming Liu, Le Mesnil-Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 217 days.

(21) Appl. No.: 17/787,055

(22) PCT Filed: Dec. 7, 2020

(86) PCT No.: PCT/FR2020/052290
§ 371 (c)(1),
(2) Date: Jun. 17, 2022

(87) PCT Pub. No.: WO2021/123544
PCT Pub. Date: Jun. 24, 2021

(65) Prior Publication Data
US 2023/0112903 A1    Apr. 13, 2023

(30) Foreign Application Priority Data

Dec. 18, 2019  (FR) ........................................ 1914757

(51) Int. Cl.
*F25D 21/08*    (2006.01)
(52) U.S. Cl.
CPC .................................. *F25D 21/08* (2013.01)

(58) Field of Classification Search
CPC .......... B60H 2001/00307; B60H 2001/00921; B60H 1/32281; B60H 2001/00961;
(Continued)

(56) References Cited

FOREIGN PATENT DOCUMENTS

| CN | 105764727 A | * | 7/2016 | ......... B60H 1/00921 |
| CN | 108790681 A | * | 11/2018 | ......... B60H 1/00278 |

(Continued)

OTHER PUBLICATIONS

Office Action Issued in Corresponding CN Application No. 202080096422.7, dated Sep. 23, 2023. (7 Pages).
(Continued)

*Primary Examiner* — Kun Kai Ma
(74) *Attorney, Agent, or Firm* — Osha Bergman Watanabe & Burton LLP (57) ABSTRACT

Disclosed is a method for defrosting a thermal regulation circuit for a vehicle, in particular for a motor vehicle, the thermal regulation circuit being provided with a refrigerant circulation loop comprising a first heat exchanger (2), susceptible to frosting, as well as second and third exchangers (4, 6), the second and third exchangers (4, 6) being intended to exchange heat between the refrigerant and a heat transfer fluid, the loop further comprising a bottle (12) for storing a part of the refrigerant, the method comprising a step, referred to as defrosting, of circulating the refrigerant successively in the second heat exchanger (4), the bottle (12) and then the first and third exchangers (2, 6), with cooling of the refrigerant in the first and second exchangers (2, 4) and heating of the refrigerant in the third exchanger (6).

10 Claims, 4 Drawing Sheets

(58) Field of Classification Search
CPC ......... F25B 5/04; F25B 25/005; F25B 47/02; F25B 49/02; F25B 2400/0409; F25B 2700/1931; F25B 2700/1933; F25B 2700/197
See application file for complete search history.

(56) References Cited

FOREIGN PATENT DOCUMENTS

| | | | | |
|---|---|---|---|---|
| CN | 109664721 A | * | 4/2019 | ......... B60H 1/00007 |
| CN | 110114234 A | | 8/2019 | |
| DE | 102013110224 A1 | * | 3/2014 | ......... B60H 1/00878 |
| FR | 2983285 A1 | * | 5/2013 | ......... B60H 1/00385 |
| FR | 3055250 A1 | | 3/2018 | |
| WO | WO-2018092464 A1 | * | 5/2018 | ......... B60H 1/00278 |
| WO | 2018/185415 A1 | | 10/2018 | |
| WO | 2019/160294 A1 | | 8/2019 | |

OTHER PUBLICATIONS

International Search Report and Written Opinion issued in corresponding International Patent Application No. PCT/FR2020/052290, mailed on Apr. 19, 2021 (11 pages).

\* cited by examiner

METHOD FOR DEFROSTING A THERMAL REGULATION CIRCUIT FOR A VEHICLE, IN PARTICULAR FOR A MOTOR VEHICLE

The invention relates to a method for defrosting a thermal regulation circuit for a vehicle, in particular for a motor vehicle. It may be in particular a circuit of a ventilation, heating and/or air conditioning system of said vehicle.

Motor vehicles are currently equipped with a thermal regulation circuit comprising a refrigerant fluid circulation loop used to heat or cool various zones or various components of the vehicle. It is particularly known practice for this circuit to be used to thermally treat an air flow sent into the vehicle interior.

In vehicles equipped with a combustion engine, the heat energy released by the engine is generally sufficient to heat the car interior. This is not the case for hybrid or electric vehicles.

The use of thermal regulation circuits not only to air condition the vehicle interior but also to heat it, by operating in heat pump mode, has therefore been proposed.

However, in the case of excessively cold outside temperatures and/or excessively humid air, the heat exchanger used by the refrigerant fluid circulation loop on the front face of the vehicle to extract the heat energy from the air becomes frosted, and it is necessary to defrost it.

Various solutions have already been proposed in this sense and the invention proposes to improve the situation.

To that end, the invention proposes a method for defrosting a thermal regulation circuit, in particular for a motor vehicle, said thermal regulation circuit being provided with a circulation loop for a refrigerant fluid comprising a first heat exchanger, liable to become frosted, and also second and third heat exchangers, the second and third heat exchangers being intended to exchange heat between the refrigerant fluid and a heat transfer fluid, said loop further comprising a bottle for storing a portion of said refrigerant fluid, said method comprising a step, referred to as defrosting step, of circulating the refrigerant fluid successively in the second heat exchanger, the bottle, and then the first and third heat exchangers with the refrigerant fluid being cooled in the first and second heat exchangers and the refrigerant fluid being heated in the third heat exchanger.

Thus, in a refrigerant fluid circulation loop configuration with a bottle located between the second and first heat exchangers in the circulation direction of the refrigerant fluid, the second and first heat exchangers form a cold source and the third heat exchanger forms a heat source when operating as a refrigeration system of the refrigerant fluid loop. The total heating capacity of the thermal regulation circuit is greater than its cooling capacity, in particular since the compressor contributes to the heating capacity. It is therefore possible to use some of this heating capacity to defrost the first heat exchanger, and this is what the invention proposes.

The method according to the invention can also comprise the following features, taken individually or in any technically possible combination forming as many embodiments of the invention:

said second and third heat exchangers are part of one and the same heat transfer fluid loop of the thermal regulation circuit, said second and third heat exchangers are connected in series in said heat transfer fluid loop, at least during said defrosting step, said second and third heat exchangers are thermally coupled by way of an intermediate heat exchanger, at least during said defrosting step, said refrigerant fluid loop is configured to operate in a heat pump mode by drawing heat from an air flow using said first heat exchanger and by returning said heat to the heat transfer fluid using said second heat exchanger, said air flow is an external air flow coming from outside the vehicle, said thermal regulation circuit is intended for the thermal treatment of a vehicle interior and/or components of a vehicle, said circulation loop for the refrigerant fluid comprises a compressor, said compressor is located between the third and second heat exchangers in the circulation direction of the refrigerant fluid, said circulation loop for the heat transfer fluid comprises an electric heating device for heating said heat transfer fluid, said electric heating device is located between the second heat exchanger and the third heat exchanger in the circulation direction of the heat transfer fluid, said circulation loop for the heat transfer fluid comprises a heater, intended for heating a car interior, said heater is located between the second heat exchanger and the third heat exchanger in the circulation direction of the heat transfer fluid, said circulation loop for the refrigerant fluid comprises a first expansion valve, said first expansion valve is located between the bottle and the first heat exchanger in the circulation direction of the refrigerant fluid, said circulation loop for the refrigerant fluid comprises a second expansion valve, said second expansion valve is located between the first and third heat exchangers in the circulation direction of the refrigerant fluid, said method comprises a step of controlling the defrosting, which step is performed in the first instance by the first expansion valve, said controlling step is performed while the second expansion valve is fully open, said controlling step is performed, in a second instance, by the second expansion valve, said method comprises a step of taking into account an flow rate of air entering the car interior, said method comprises a step of controlling the heat dispensed by the electric heating device, said method comprises a step of controlling the flow rate of heat transfer fluid, said method comprises a step of determining the pressure in the third heat exchanger, said method comprises a step of increasing the flow rate of heat transfer fluid if the pressure determined is below a first predetermined threshold, the pressure is determined by a pressure measuring sensor and/or equated to a pressure at the inlet of the compressor, the heat transfer fluid circuit has a pump for circulation of the fluid, said method comprises a step of controlling a flow rate of heat transfer fluid by varying a rotational speed of the pump, said method comprises a step of verifying a state of superheating of the refrigerant fluid at the outlet of the third heat exchanger, said method comprises a step of limiting the flow rate of heat transfer fluid if the state of superheating of the refrigerant fluid is greater than a threshold at the outlet of the third heat exchanger, said method includes a step of determining a compression ratio of the compressor, the compression ratio being equal to the ratio of an outlet pressure and an inlet pressure of the compressor, said method comprises a step of increasing the flow rate of heat transfer fluid if the compression ratio is above a second predetermined threshold, said method includes a step of reducing the flow rate of heat transfer fluid if the compression ratio is below a third predetermined threshold.

Further features and advantages of the invention will become apparent from reading the following detailed description, for an understanding of which reference will be made to the appended drawings, in which.

As illustrated in FIGS. 1 to 6, the invention applies to a thermal regulation circuit for a vehicle, in particular a motor vehicle, and relates to a method for defrosting said circuit. Said circuit comprises a circulation loop for a refrigerant fluid and, in this instance, a circulation loop for a heat transfer fluid. Said loops are preferably closed.

The terms upstream and downstream used in the following description refer to the circulation direction of the fluid in question, that is to say the refrigerant fluid, the heat transfer fluid, a flow of air external to a vehicle interior and/or an internal air flow sent to the vehicle interior.

Figure 1:
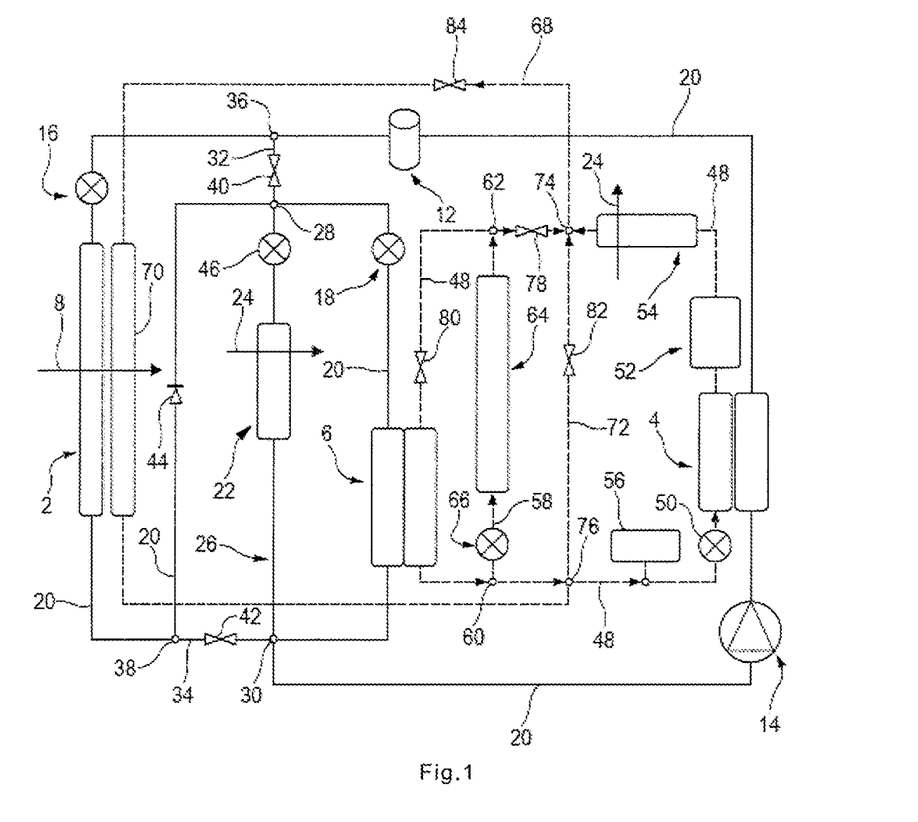
FIG. 1 schematically illustrates an example of a circulation loop for implementing the defrosting method in accordance with the invention.

In FIG. 1, the refrigerant fluid loop is illustrated in solid lines and the heat transfer fluid loop is illustrated in chain lines. In FIGS. 2 to 6, for each of the loops, the portions through which their respective fluid is passing are shown in solid lines and the portions without circulating fluid are shown in dotted lines. Use is also made of solid lines of different line thicknesses. More specifically, the thick lines correspond to high-pressure portions and the thin lines to low-pressure portions of the refrigerant fluid loop.

The identifiers "first", "second", etc. used hereinafter are not intended to indicate a level of hierarchy of or to order the terms they accompany. These identifiers serve just to distinguish the terms which they accompany and can be interchanged without narrowing the scope of the invention.

The refrigerant fluid is, for example, a fluid capable of transitioning from a liquid phase to a gas phase and vice versa under the temperature and pressure conditions of the circulation loop for the refrigerant fluid. It may be a fluid known by the name of R134a or a fluid known by the name of R1234yf. It may even be a fluid that remains essentially in the gaseous state, such as R744.

The heat transfer fluid is, for example, a liquid, notably water with the addition of an antifreeze such as glycol.

The refrigerant fluid circulation loop comprises a first heat exchanger 2, liable to become frosted, and also a second heat exchanger 4 and a third heat exchanger 6. Said second heat exchanger 4 and said third heat exchanger 6 are intended to exchange heat between the refrigerant fluid and the heat transfer fluid.

The method according to the invention aims to allow the defrosting of the first heat exchanger 2 by virtue of a defrosting step, as will be established below.

Said refrigerant fluid loop is preferably configured to operate not only in a defrosting mode but also in various other modes, in particular an air conditioning mode, with or without battery cooling, a heat pump mode, and/or a heat recovery mode, among others.

In the heat pump mode, said refrigerant fluid circulation loop is configured to operate by drawing heat from an air flow, symbolized by an arrow denoted by 8, using said first heat exchanger 2 and by returning said heat to the heat transfer fluid using said second heat exchanger 4. In this way, if the outside air is too cold and/or too humid, the first heat exchanger 2 can become covered with frost. This is because, since the air loses heat in contact with the first heat exchanger 2, the water particles present in the air solidify and are deposited on the heat exchanger. This can then no longer perform its function since the layer of frost thus formed isolates it from the air. That being said, the defrosting step in accordance with the invention may be implemented whether the icing has appeared due to the above phenomenon or for any other reason.

Said circulation loop is intended, for example, for the thermal treatment of a vehicle interior and/or components of a vehicle and said air flow is an external air flow coming from outside the vehicle. Said first heat exchanger 2 comprises, for example, one or more circulation passes for the refrigerant fluid. It is, in particular, an evaporator/condenser. It is intended to be positioned on the front face of the vehicle, said air flow that passes through it having previously passed through the grille. Said second heat exchanger 4 comprises, for example, one or more circulation passes for the refrigerant fluid and one or more circulation passes for the heat transfer fluid. In this way, it forms a bi-fluid heat exchanger, in particular a condenser for the refrigerant fluid. Said third heat exchanger 6 comprises, for example, one or more circulation passes for the refrigerant fluid and one or more passes for the heat transfer fluid. In this way, it forms a bi-fluid heat exchanger, in particular a cooler for the heat transfer fluid.

Said circulation loop for the refrigerant fluid further comprises a bottle 12 for storing a portion of said refrigerant fluid. Here, said bottle is located between the second heat exchanger 4 and the first heat exchanger 2, in the circulation direction of the refrigerant fluid.

Said circulation loop for the refrigerant fluid further comprises a compressor 14. Said compressor 14 is located between the third heat exchanger 6 and the second heat exchanger 4, in the circulation direction of the refrigerant fluid. Said circulation loop for the refrigerant fluid further comprises a first expansion valve 16, located between the bottle 12 and the first heat exchanger 2, in the circulation direction of the refrigerant fluid, and a second expansion valve 18, located between the first heat exchanger 2 and the third heat exchangers 6, in the circulation direction of the refrigerant fluid.

Advantageously, the compressor 14, the second heat exchanger 4, the bottle 12, the first expansion valve 16, the first heat exchanger 2 and the second expansion valve 18 and the third heat exchanger 6 form a closed circuit 20, referred to as defrosting circuit, in which the refrigerant fluid is intended to circulate in this order, under the action of the compressor 14. Here, the first expansion valve 16 and the second expansion valve 18 are interposed between the bottle 12 and the first heat exchanger 2, and between the first heat exchanger 2 and the third heat exchanger 6, respectively.

In the embodiment illustrated, said circulation loop for the refrigerant fluid further comprises a fourth heat exchanger 22. Said fourth heat exchanger 22 is advantageously intended to exchange heat between the refrigerant fluid and an internal air flow, illustrated by an arrow denoted 24, intended to be introduced into the vehicle interior. Said fourth heat exchanger 22 comprises, for example, one or more circulation passes for the refrigerant fluid. It is, in particular, an evaporator for the refrigerant fluid.

Here, said circulation loop for the refrigerant fluid comprises, in addition to the defrosting loop 20, a first diversion branch 26, located between a first diversion point 28 and a second diversion point 30. The first diversion point 28 is located between the first heat exchanger 2 and the second expansion valve 18 on the defrosting circuit 20. The second diversion point 30 is located between the third heat exchanger 6 and the compressor 14 on the defrosting circuit 20. Said first diversion branch comprises the evaporator 22 and a third expansion valve 46, located between the first diversion point 28 and the evaporator 22.

The first expansion valve 16, the second expansion valve 18 and/or the third expansion valve 46 are advantageously configured to selectively fully open, fully close, or cause the refrigerant fluid circulating in the circuit and/or the associated branch to expand, depending on a given flow rate.

Said circulation loop for the refrigerant fluid further comprises, in particular, a first bypass branch 32 and a second bypass branch 34. The first bypass branch is located between a first bypass point 36 and the first diversion point 28. The first bypass point 36 is located between the bottle 12 and the first expansion valve 16 on the defrosting circuit 20. The second bypass branch is located between a second bypass point 38 and the second diversion point 30. The first bypass branch comprises a first bidirectional valve 40 and/or the second bypass branch comprises a second bidirectional valve 42. It will also be noted that the defrosting circuit comprises a non-return valve 44 between the second bypass point 38 and the first diversion point 28.

As a variant, although this is not illustrated, the circulation loop for the refrigerant fluid comprises one or more internal heat exchangers.

Said second and third heat exchangers 4, 6 form part of the heat transfer fluid loop, said second and third heat exchangers 4, 6 being connected in series at least during said defrosting step, the advantage of which will be elucidated later on. Expressed differently, said second and third heat exchangers preferably form part of the same circulation loop for the heat transfer fluid and the heat transfer fluid entering one enters the other, at least during said defrosting step.

According to an embodiment which is not shown, said second and third heat exchangers are thermally coupled by way of an intermediate heat exchanger, at least during said defrosting step. Expressed differently, the heat transfer fluid circuit in which the second heat exchanger is arranged does not communicate fluidically with the heat transfer fluid circuit in which the third heat exchanger is arranged. Heat is exchanged between the second and the third heat exchanger via the intermediate heat exchanger.

Here, said circulation loop for the heat transfer fluid comprises a circuit 48, referred to as main circuit, comprising the second heat exchanger 4 and the third heat exchanger 6. Said main circuit 48 further comprises a main pump 50 for circulating the heat transfer fluid.

Said circulation loop for the heat transfer fluid further comprises an electric heating device 52 for heating said heat transfer fluid, located between the second heat exchanger 4 and the third heat exchanger 6 in the circulation direction of the heat transfer fluid in the main circuit 48.

Here, said circulation loop for the heat transfer fluid again comprises a heater 54, intended for heating the car interior, in particular by exchanging heat with the internal air flow 24. Said heater 54 is located between the second heat exchanger 4 and the third heat exchanger 6, in particular between the electric heating device 52 and the third heat exchanger 6, in the circulation direction of the heat transfer fluid in the main circuit.

In other words, here, said main circuit 48 comprises, in the following order in the direction of circulation of the heat transfer fluid: the main pump 50, the second heat exchanger 2, the electric heating device 52, the heater 54 and the third heat exchanger 6. It is also provided with an expansion vessel 56, located for example upstream of the main pump 50.

The circulation loop for the heat transfer fluid further comprises, as illustrated, a first looping branch 58, located between a first looping point 60 and a second looping point 62. The first looping point 60 is located between the third heat exchanger 6 and the main pump 50 on the main circuit 48. Said second looping point 62 is located between the heater 54 and the third heat exchanger 6 on the main circuit 48. Said first looping branch 58 comprises a fifth heat exchanger 64, intended in particular for the thermal regulation of electrical components of the vehicle, such as a battery, and/or electronic components by direct or indirect heat exchange. Said first looping branch 58 further comprises a looping pump 66.

Here, said circulation loop again comprises a second looping branch 72 between a third looping point 74 and a fourth looping point 76. The third looping point is located between the heater 54 and the second looping 62 on the main circuit 48. The fourth looping point is located between the first looping point 60 and the main pump 50 on the main circuit 48.

Here, said circulation loop for the heat transfer fluid further comprises a second diversion branch 68. Said second diversion branch 68 comprises a cooler 70. Here, said cooler 70 is located on the front face of the vehicle so as to be passed through by the external air flow 8. It is preferably located downstream of the first heat exchanger 2 in the circulation direction of the air. Said second diversion branch is located between the third looping point 74 and the fourth looping point 76.

To provide the various circulation modes desired, the circulation loop for the heat transfer fluid further comprises valves, in particular bidirectional valves. They involve, for example, a third bidirectional valve 78 located on the main circuit 48 between the third looping point 74 and the second looping point 62. They also involve a fourth bidirectional valve 80 located on the main circuit 48 between the second looping point 62 and the third heat exchanger 6. They also involve a fifth bidirectional valve 82 located on the second looping branch 72. They also involve a sixth bidirectional valve 84 located on the second diversion branch 68.

In this configuration, said expansion vessel 56 is located on the main circuit 48 between the fourth looping point 76 and the main pump 50.

Figure 2:
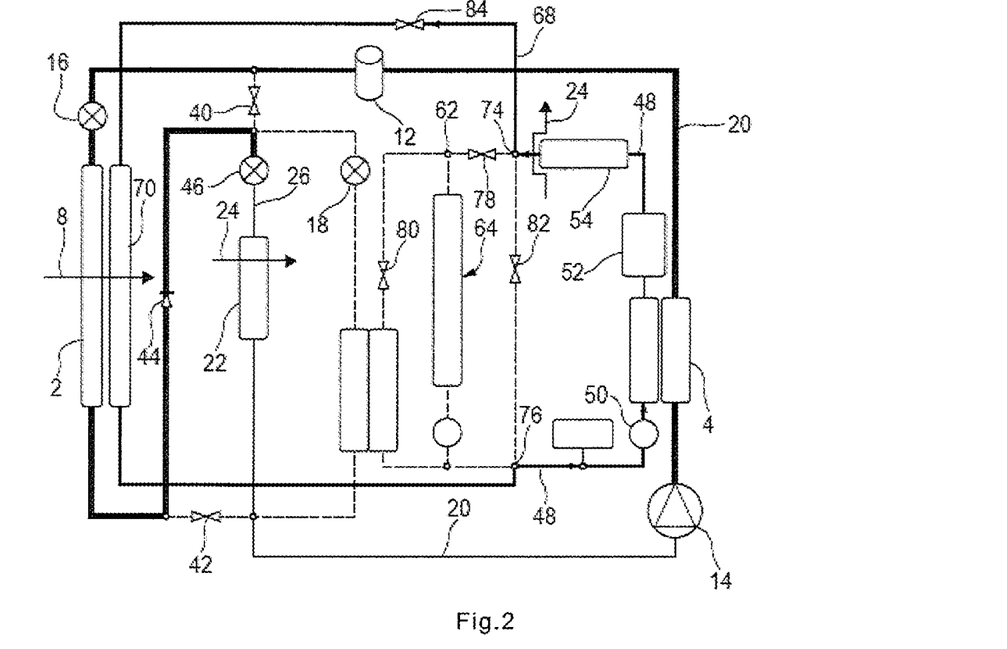
FIG. 2 illustrates the circulation loop from FIG. 1 in an air conditioning mode without component cooling.

As is illustrated in FIG. 2, with the circuit example described above, in addition to the defrosting step according to the invention, it is also possible to air condition the car interior, without cooling the electrical components.

In this operating mode of cooling the car interior, and as is illustrated in FIG. 2, the circulation loop for the refrigerant fluid is traversed as follows. At the outlet of the compressor 14, the refrigerant fluid first of all follows the defrosting loop 20 and passes through the second heat exchanger 4, dispensing heat to the heat transfer fluid as it does so. Said refrigerant fluid then transitions from a gaseous state under high pressure to a liquid state, or at the very least essentially liquid state. It then passes through the bottle 12 in which any gaseous fraction of the fluid is separated from the liquid fraction such that the fluid leaves the bottle in the liquid phase. It then passes through the expansion valve 16, which is fully open, and the first heat exchanger 2 where it undergoes forced cooling in contact with the external air flow 8. It then passes through the non-return valve 44 so as to reach the first diversion branch 26 where it passes through the third expansion valve 46, transitioning to a low pressure as it does so. It then passes through the evaporator 22 where it changes phase to return to the vapor phase and thereby cool the internal air flow 24, making it possible to cool the car interior. It then comes back to the end of the defrosting circuit 20 in order to reach the compressor 14 for a new cycle.

In this mode, the first bidirectional valve 40 and the second bidirectional valve 42 are closed, as is the second expansion valve 18.

Still in this mode, the circulation loop for the heat transfer fluid is traversed as follows. At the outlet of the main pump 50, the heat transfer fluid follows the main circuit 48 and passes through the second heat exchanger 4 where it is heated by the refrigerant fluid. The heat transfer fluid then passes through the electric heating device 52, which is not active. In a variant which is not illustrated, it may pass through a bypass branch of said device. The heat transfer fluid then passes through the heater 54 which is bypassed by the internal air flow 24 in order not to heat the latter. The heat transfer fluid then takes the second diversion branch 68 at the third looping point 74 so as to pass through the sixth bidirectional valve 84 and the cooler 70 in which it cools on contact with the external air flow 8. It then comes back to the main circuit 48 at the fourth looping point 76 before reaching the main pump 50 for a new cycle.

In this mode, the third bidirectional valve 78, the fourth bidirectional valve 80 and the fifth bidirectional valve 82 are closed. The sixth bidirectional valve 84 is open.

Figure 3:
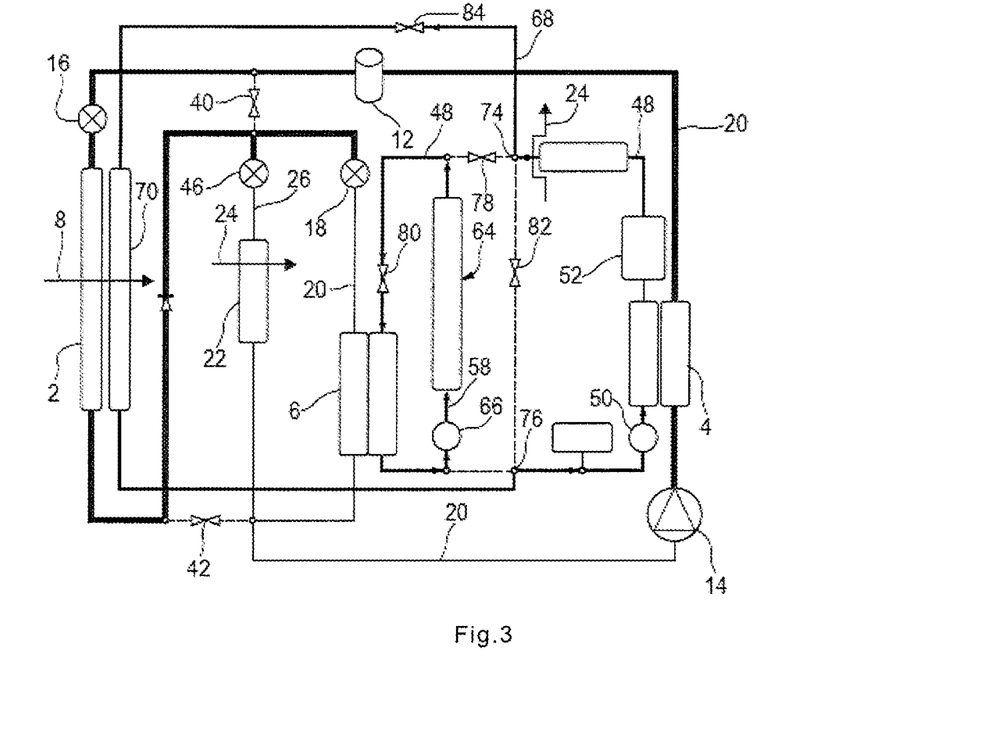
FIG. 3 illustrates the circulation loop from FIG. 1 in an air conditioning mode with component cooling.

As is illustrated in FIG. 3, with the circuit example described above, it is also possible to air condition the car interior with simultaneous cooling of the electrical components.

The path of the refrigerant fluid in the corresponding circulation loop is the same as in the previous operating mode, except that the second expansion valve 18 is open. The refrigerant fluid thus circulates in the entirety of the defrosting circuit 20 and in the first diversion branch 26. It therefore also enters the second expansion valve 18, downstream of which it is at low pressure, and the third heat exchanger 6 where it cools the heat transfer fluid by transitioning into the gaseous phase.

Still in this mode, the circulation loop for the heat transfer fluid is traversed in two sub-loops, the first sub-loop corresponding to the heat transfer fluid circuit of the previous mode. In a second sub-loop, the heat transfer fluid follows the following path. At the outlet of the looping pump 66, the heat transfer fluid passes through the fifth heat exchanger 64, by virtue of which it cools the electrical components. It then enters a portion of the main circuit 48 where it passes through the fourth bidirectional valve 80 and the third heat exchanger 6, where it cools before returning to the first looping branch 58 in order to reach the looping pump 66 for a new cycle.

In this mode, the third bidirectional valve 78 and the fifth bidirectional valve 82 are closed. The fourth bidirectional valve 80 and the sixth bidirectional valve 84 are open.

Figure 4:
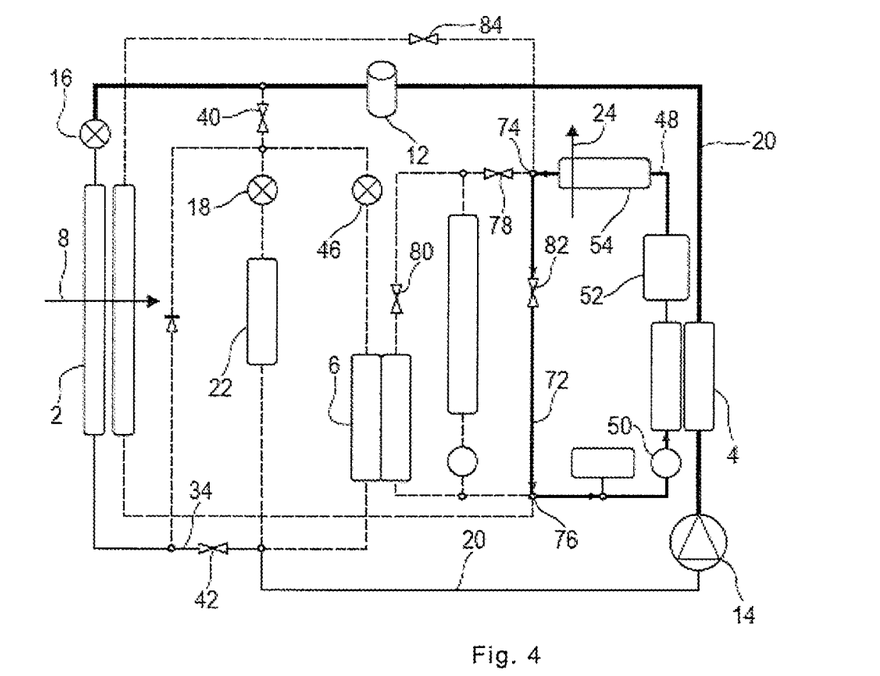
FIG. 4 illustrates the circulation loop from FIG. 1 in a heat pump mode.

As is illustrated in FIG. 4, with the circuit example described above, it is also possible to air condition the car interior in heat pump mode.

The circulation loop for the refrigerant fluid is traversed as follows. At the outlet of the compressor 14, the refrigerant fluid first of all follows the defrosting loop 20 and passes through the second heat exchanger 4, dispensing heat to the heat transfer fluid as it does so. Said refrigerant fluid then transitions from a gaseous state under high pressure to a liquid state, or at the very least essentially liquid state. It then passes through the bottle 12 in which any gaseous fraction of the fluid is separated from the liquid fraction such that the fluid leaves the bottle in the liquid phase. It then passes through the expansion valve 16, transitioning to a low pressure as it does so, and the first heat exchanger 2 operating as an evaporator where it undergoes transition into the gaseous phase by virtue of the heat energy extracted from the external air flow 8. It then passes through the second bidirectional valve 42, taking the second bypass branch 34, before reaching the compressor 14 via the end portion of the defrosting circuit 20.

In this mode, the first bidirectional valve 40 is closed, as are the second expansion valve 18 and the third expansion valve 46. Thus, neither the third heat exchanger 6 nor the evaporator 22 are passed through by the refrigerant fluid.

Still in this mode referred to as heat pump mode, the circulation loop for the heat transfer fluid is traversed as follows. At the outlet of the main pump 50, the heat transfer fluid follows the main circuit 48 and passes through the second heat exchanger 4 where it is heated by the refrigerant fluid. The heat transfer fluid then passes through the electric heating device 52, which may be active, to supplement the action of the second heat exchanger 4. The heat transfer fluid then passes through the heater 54 which thereby heats the internal air flow 24. The heat transfer fluid then takes the second looping branch 72 at the third looping point 74 so as to pass through the fifth bidirectional valve 82 before coming back to the main circuit at the fourth looping point 76 and reaching the main pump 50 for a new cycle.

In this mode, the third bidirectional valve 78, the fourth bidirectional valve 80 and the sixth bidirectional valve 84 are closed. The fifth bidirectional valve 82 is open.

Figure 5:
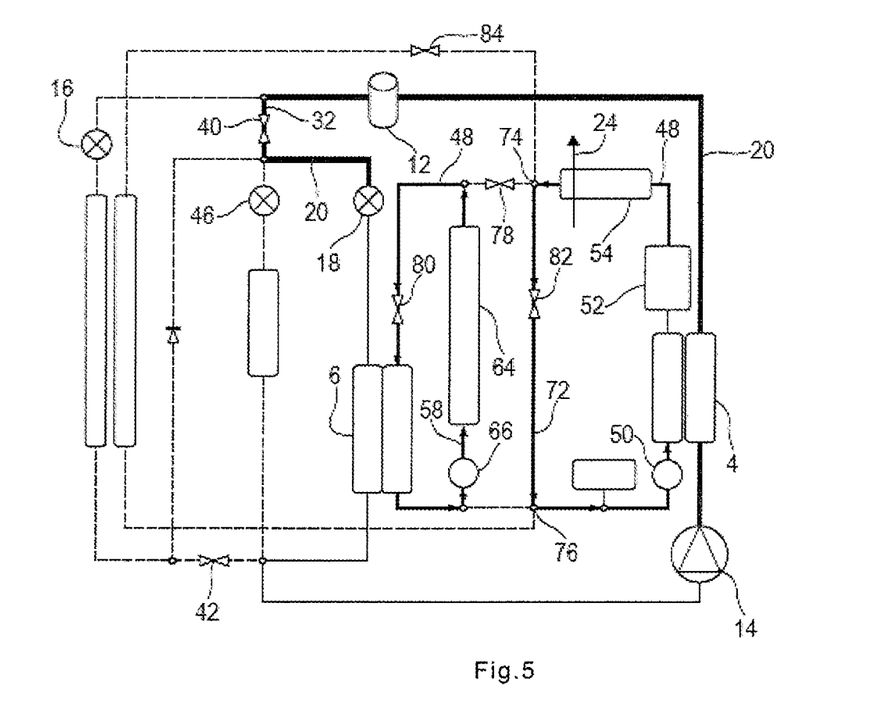
FIG. 5 illustrates the circulation loop from FIG. 1 in a heat recovery mode.

As is illustrated in FIG. 5, with the circuit example described above, it is also possible for heat to be recovered.

The circulation loop for the refrigerant fluid is traversed as follows. At the outlet of the compressor 14, the refrigerant fluid first of all follows the defrosting loop 20 and passes through the second heat exchanger 4, dispensing heat to the heat transfer fluid as it does so. Said refrigerant fluid then transitions from a gaseous state under high pressure to a liquid state, or at the very least essentially liquid state. It then passes through the bottle 12 in which any gaseous fraction of the fluid is separated from the liquid fraction such that the fluid leaves the bottle in the liquid phase. It then passes through the first bypass branch 32, passing through the first bidirectional valve 40. It then joins the defrosting circuit so as to enter the second expansion valve 18, downstream of which it is at low pressure, and into the third heat exchanger 6 where it transitions into the gaseous phase by virtue of the heat energy provided by the heat transfer fluid. Lastly, it returns to the compressor 14 for a new cycle.

In this mode, the second bidirectional valve 42 is closed, as are the first expansion valve 16 and the third expansion valve 46.

Still in this mode, the circulation loop for the heat transfer fluid is traversed in two sub-loops, the first sub-loop corresponding to the heat transfer fluid circuit of the previous mode and the second sub-loop to the second sub-loop of the embodiment for air conditioning with the cooling of electrical components.

In this mode, referred to as heat recovery mode, the heat collected in contact with the electrical components is used to heat the refrigerant fluid by virtue of the second sub-loop for heat transfer fluid. The refrigerant fluid can in this way provide heat energy to the first sub-loop for heat transfer fluid in order to heat the internal air flow 24. The heat from the electrical components is therefore recovered in order to heat the car interior.

In this mode, the third bidirectional valve 78 and the sixth bidirectional valve 84 are closed. The fourth bidirectional valve 80 and the fifth bidirectional valve 82 are open.

Figure 6:
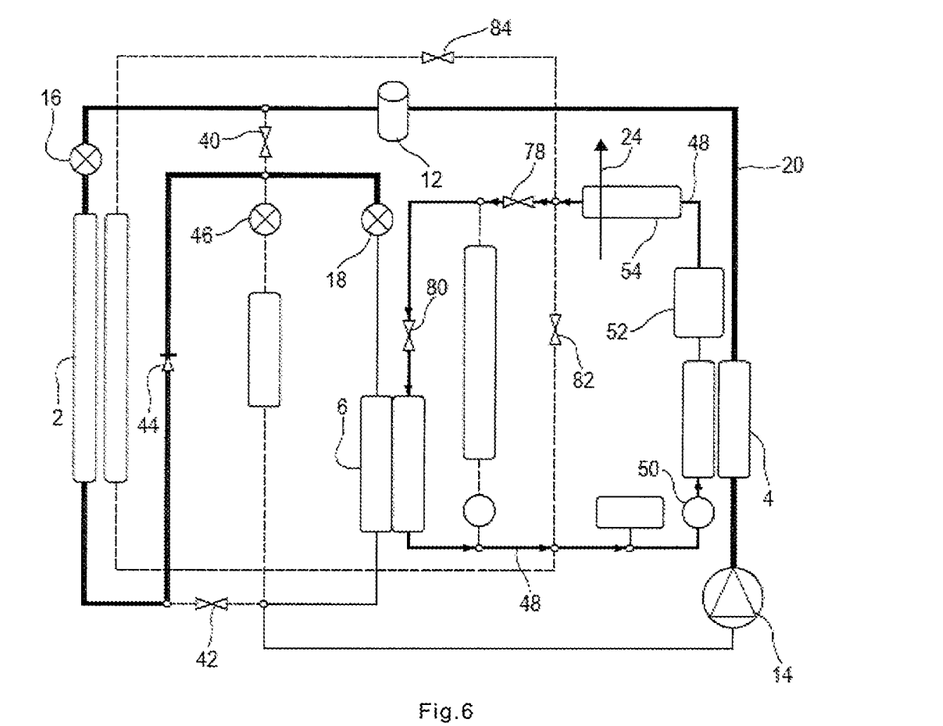
FIG. 6 illustrates the circulation loop from FIG. 1 in a defrosting mode according to the defrosting method in accordance with the invention.

That being said, as is illustrated in FIG. 6 and as was already indicated above, the method in accordance with the invention has the primary aim of allowing the first heat exchanger 2 to be defrosted by virtue of said defrosting step.

In this step, the refrigerant fluid is made to circulate successively in the second heat exchanger 4, the bottle 12, and then the first heat exchanger 2 and the third heat exchanger 6, with the refrigerant fluid being cooled in the first heat exchanger 2 and in the second heat exchanger 4 and the refrigerant fluid being heated in said third heat exchanger 6. Thus, the second heat exchanger 4 and the first heat exchanger 2 form a cold source and the third heat exchanger 6 forms a hot source when the refrigerant fluid loop is operating as a refrigeration system, the difference between the heating capacity of the second heat exchanger 4 and the cooling capacity of the third heat exchanger 6 providing a heating capacity to the first heat exchanger 2, said heating capacity allowing said first heat exchanger 2 to be defrosted. The total heating capacity of the thermal regulation circuit is greater than its cooling capacity, in particular since the compressor contributes to the heating capacity. It is therefore possible to use some of this heating capacity to defrost the first heat exchanger, and this is what the invention proposes.

More specifically, with the circuit example described above, the circulation loop for the refrigerant fluid is traversed as follows. At the outlet of the compressor 14, the refrigerant fluid follows the defrosting loop 20 and passes through the second heat exchanger 4, dispensing heat to the heat transfer fluid as it does so. Said refrigerant fluid then transitions from a gaseous state under high pressure to a liquid state, or at the very least essentially liquid state. It then passes through the bottle 12 in which any gaseous fraction of the fluid is separated from the liquid fraction such that the fluid leaves the bottle in the liquid phase. It then passes through the expansion valve 16, where it undergoes expansion, and the first heat exchanger 2, the walls of which it heats, allowing it to be defrosted. It then passes through the non-return valve 44 and then the second expansion valve 18, which may be fully open. It then passes through the third heat exchanger 6 where it changes phase to return to the vapor phase by virtue of the heat supplied by the heat transfer fluid. Lastly, it reaches the compressor 14 for a new cycle.

In this mode, the first bidirectional valve 40 and the second bidirectional valve 42 are closed, as is the third expansion valve 46 such that the refrigerant fluid only traverses the defrosting loop 20.

Still in this mode, the circulation loop for the heat transfer fluid is traversed as follows. At the outlet of the main pump 50, the heat transfer fluid follows the main circuit 48 and passes through the second heat exchanger 4 where it is heated by the refrigerant fluid. The heat transfer fluid then passes through the electric heating device 52, which may be active. The heat transfer fluid then passes through the heater 54, where it may possibly heat the internal air flow 24. The heat transfer fluid then enters the third bidirectional valve 78, the fourth bidirectional valve 80 and the third heat exchanger 6, where it is cooled by giving its heat to the refrigerant fluid. It then continues along the main circuit 48 in order to reach the main pump 50 for a new cycle.

In this mode, the fifth bidirectional valve 82 and the sixth bidirectional valve 84 are closed. The third bidirectional valve 78 and the fourth bidirectional valve 80 are open.

As already indicated, said second and third heat exchangers 4, 6 preferably form part of the heat transfer fluid loop, said second and third heat exchangers 4, 6 being connected in series at least during said defrosting step. The advantage of such a configuration is that the heat dispensed by the refrigerant fluid to the heat transfer fluid by the second heat exchanger 4 is reintroduced at least partially into the refrigerant fluid by the third heat exchanger 6. In this way, what is available is a defrosting mode which can operate without any other heat exchange and by virtue of a limited energy input, in this instance the energy input from the compressor 14 and, to the margin, the energy input from the main pump 50.

This being the case, as mentioned above and if necessary, in defrosting mode, the electric heating device 52 of said heat transfer fluid may be active and thus allow the refrigerant fluid to have a greater heating capacity for the defrosting. This is because, if heat is supplied by the electric heating device 52, taking into account the then higher temperature of the heat transfer liquid in the circulation loop for the heat transfer fluid and the heat exchanges occurring between the heat transfer fluid and the refrigerant fluid, said refrigerant fluid then operates at higher pressure in the circulation loop for the refrigerant fluid.

By way of example, the heat transfer liquid is heated to 40° C. by the electric heating device 52 and it is cooled to 30° C. in the third heat exchanger 6 before being heated by the second heat exchanger 4 to approximately 36° C. and starting a new heat exchange cycle. For its part, the refrigerant fluid is cooled first of all in the second heat exchanger 4, in order to heat the heat transfer liquid, and then in the first heat exchanger 2, which it defrosts. It is then heated in the third heat exchanger 6 by virtue of the heat energy then supplied by the heat transfer liquid, which cools.

To keep the car interior comfortable, as was mentioned above and if desired, the heating capacity of the heat transfer fluid may also be used to heat the internal air flow 24.

Advantageously, said method comprises a step of controlling the defrosting. Preferably, this is carried out in the first instance by the first expansion valve 16, in particular by opening or closing said first expansion valve 16 as needed, the second expansion valve 18 being fully open or at the very least without changing the degree of opening of the second expansion valve 18. Such regulation is performed, for example, so that the state of superheating of the refrigerant fluid at the inlet of the compressor 14 is between a lower limit and an upper limit.

If the action of the first expansion valve 16 is not sufficient, then in the second instance the second expansion valve 18 is made to intervene, which closes gradually if necessary, in particular if the state of superheating of the refrigerant fluid at the outlet of the third heat exchanger 6 is too low and/or if the pressure of the refrigerant fluid in the first heat exchanger 2 is insufficient. By way of example, it will be ensured that the pressure of the refrigerant fluid in the first heat exchanger 2 is greater than 4 bar.

By way of example, the second expansion valve 18 is fully open and the state of the refrigerant fluid at the inlet of the compressor 14 is controlled by virtue of the first expansion valve 16. If the heat transfer liquid is not hot enough at the third heat exchanger 6 and/or if the pressure of the refrigerant fluid in the first heat exchanger 2 is too low, the closure of the third expansion valve 18 is initiated so as to keep the refrigerant fluid in the first heat exchanger 2 at a pressure allowing the defrosting and/or keep said refrigerant fluid in a superheated state at the inlet of the compressor 14. Conversely, if the pressure and state conditions of the fluid are met when the second expansion valve 18 is not fully open, it will be possible to proceed with the opening of said second expansion valve 18, possibly until it is fully open, if the conditions allow it.

Expressed differently, said method comprises a step of verifying a state of superheating of the refrigerant fluid at the outlet of the third heat exchanger 6. Such a verification step may however have a regulating action other than the opening/closing of the first expansion valve 16 and/or of the second expansion valve 18, as will be mentioned below.

As an alternative or in addition, said method comprises a step of controlling the flow rate of heat transfer fluid.

Advantageously, said method comprises a step of limiting the flow rate of heat transfer fluid, in particular if the state of superheating of the refrigerant fluid is less than a threshold at the outlet of the third heat exchanger 6. Limiting the flow rate of heat transfer fluid allows the refrigerant fluid to have a greater heating capacity for the defrosting.

That being said, it is preferable for a minimum flow rate of heat transfer fluid to be maintained, in particular in order that the state of superheating of the refrigerant fluid at the outlet of the third heat exchanger 6 is greater than the chosen threshold. Said method provides in this sense, for example, a step of determining the pressure of refrigerant fluid in the third heat exchanger 6 and a step of increasing the flow rate of heat transfer fluid if the determined pressure is lower than a first predetermined threshold.

The pressure of refrigerant fluid in the third heat exchanger 6 is determined, in particular, by a pressure measuring sensor. As an alternative, this pressure is equated to the pressure at the inlet of the compressor 14.

The flow rate of heat transfer fluid is controlled, for example, by varying a rotational speed of the pump driving said heat transfer fluid in the defrosting mode, in this instance the main pump 50.

As an alternative or in addition, the flow rate of heat transfer fluid may be regulated by making provision that the method in accordance with the invention includes a step of determining a compression ratio of the compressor 14, the compression ratio being equal to the ratio of the outlet pressure and the inlet pressure of the compressor, and a step of increasing the flow rate of heat transfer fluid if the compression ratio is greater than a predetermined upper threshold. Specifically, the flow rate of heat transfer fluid is increased if the compression ratio is too high, since the reliability of the compressor 14 would then be put at risk.

Conversely, said method includes a step of reducing the flow rate of heat transfer fluid if the compression ratio is below a predetermined low threshold. For example, the flow rate of heat transfer fluid can be reduced as long as the compression ratio is sufficiently greater than 1.

The choice of the heating power dispensed by the electric heating device 52 and/or of the flow rate of heat transfer fluid make it possible to render the defrosting more or less effective and/or more or less quick.

If the heating power dispensed by the electric heating device 52 is too weak, then there is a risk that the energy available for the defrosting is too limited, with defrosting being slower in that case. Furthermore, if the heating power dispensed by the electric heating device 52 is too strong, the heat transfer fluid will be too hot, thereby possibly leading to losses by dissipation.

The method in accordance with the invention may thus comprise a step of controlling the heat dispensed by the electric heating device 52. Such control may be carried out with respect to a threshold temperature such that its heating action is increased if the temperature recorded is lower than the threshold temperature and decreased in the opposite case.

One and the same optimization strategy is advantageous for the flow rate of heat transfer fluid. A low flow rate of heat transfer fluid creates a large difference between the temperature of the heat transfer fluid in the third heat exchanger 6 and the temperature of the heat transfer fluid in the second heat exchanger 4, thereby in turn generating a large difference between a high-pressure level and a low-pressure level of the refrigerant fluid in the refrigerant fluid loop, this being favorable for the defrosting. However, if the flow rate of heat transfer fluid is too low, the temperature of the heat transfer fluid in the third heat exchanger 6 will be too low, which this time will adversely affect proper operation of the circulation loop for the refrigerant fluid.

As an alternative or in addition, said method comprises a step of taking into account a flow rate of air entering the car interior in accordance with the internal air flow 24. This makes it possible to measure the influence of possible operation of the heater 54 on the defrosting.

The heating power dispensed by the electric heating device 52 will advantageously be increased if there is a desire to heat the internal air flow 24.

The invention claimed is:

1. A method for defrosting a thermal regulation circuit for a motor vehicle, said thermal regulation circuit being provided with a circulation loop for a refrigerant fluid comprising a first heat exchanger, liable to become frosted, and also second and third heat exchangers, the second and third heat exchangers being configured to exchange heat between the refrigerant fluid and a heat transfer fluid, said circulation loop further comprising a bottle for storing a portion of said refrigerant fluid, said method comprising:
 a defrosting step, of circulating the refrigerant fluid successively in the second heat exchanger, the bottle, and then the first and third heat exchangers with the refrigerant fluid being cooled in the first and second heat exchangers and the refrigerant fluid being heated in said third heat exchanger,
 wherein said circulation loop for the refrigerant fluid comprises:
  a first expansion valve, located between the bottle and the first heat exchanger in the circulation direction of the refrigerant fluid, and
  a second expansion valve, located between the first heat exchanger and the third heat exchanger in the circulation direction of the refrigerant fluid; and
 controlling the defrosting that is performed in the first instance by the first expansion valve, the second expansion valve being fully open, and then in the second instance by the second expansion valve.

2. The method as claimed in claim 1, wherein said second and third heat exchangers form part of one and the same heat transfer fluid loop of the thermal regulation circuit, said second and third heat exchangers being connected in series at least during said defrosting step.

3. The method as claimed in claim 1, wherein said refrigerant fluid loop is configured to operate in a heat pump mode by drawing heat from an air flow using said first heat exchanger and by returning said heat to the heat transfer fluid using said second heat exchanger.

4. The method as claimed in claim 1, further comprising: controlling a flow rate of heat transfer fluid; determining a pressure in the third heat exchanger; and increasing the flow rate of heat transfer fluid if the determined pressure is lower than a first predetermined threshold.

5. The method as claimed in claim 1, wherein said circulation loop for the heat transfer fluid comprises an electric heating device for heating said heat transfer fluid, said electric heating device being located between the second heat exchanger and the third heat exchanger in the circulation direction of the heat transfer fluid.

6. The method as claimed in claim 5, further comprising: controlling the heat dispensed by the electric heating device.

7. The method as claimed in claim 1, wherein said circulation loop for the refrigerant fluid comprises a compressor, said compressor being located between the third and second heat exchangers in the circulation direction of the refrigerant fluid.

8. The method as claimed in claim 7, further comprising: determining a compression ratio of the compressor, the compression ratio being equal to the ratio of the outlet pressure and the inlet pressure of the compressor, and a step of increasing the flow rate of heat transfer fluid if the compression ratio is greater than a second predetermined threshold.

9. The method as claimed in claim 8, further comprising: reducing the flow rate of heat transfer fluid if the compression ratio is below a third predetermined threshold.

10. The method as claimed in claim 1, wherein said second and third heat exchangers are thermally coupled by way of an intermediate heat exchanger, at least during said defrosting step.

* * * * *